H. BERDAN.
Breech Loader.
No. 3,118. Reissued Sept. 15, 1868.
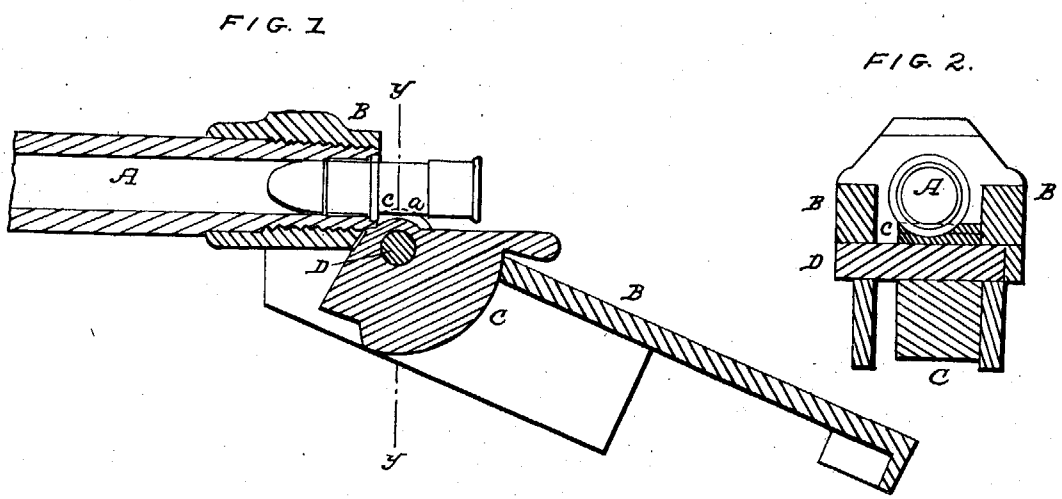
WITNESSES:
A. Lollere
A. Kimmer
INVENTOR
C. L. Perkins Pres.
Isaac Tryer Secy
of The Berdan
Fire-arms Manfg Co
per Brumburnlof Z Attys
N. PETERS, Photo-Lithographer, Washington, D. C.

UNITED STATES PATENT OFFICE.

BERDAN FIRE ARMS MANUFACTURING COMPANY, OF NEW YORK, N. Y., ASSIGNEES OF HIRAM BERDAN.

IMPROVEMENT IN BREECH-LOADERS.

Specification forming part of Letters Patent No. 51,991, dated January 9, 1866; Reissue No. 3,118, dated September 15, 1868.

DIVISION B.

*To all whom it may concern:*

Be it known that we, the BERDAN FIRE ARMS MANUFACTURING COMPANY, of the city, county, and State of New York, assignees of HIRAM BERDAN, obtained Letters Patent dated January 9, 1866, and numbered 51,991, for Improvements in Breech-Loading Fire-Arms; and we do hereby declare that the following is a full, clear, and exact description of one of said improvements desired to be embraced in separate Letters Patent, reference being had to the accompanying drawings, forming part of this specification, in which—

Figure 1 is a central vertical longitudinal section of the breech parts of a fire-arm illustrating this improvement. Fig. 2 is a transverse section of the same, taken in the plane indicated by the lines *y y* in Fig. 1.

Similar letters of reference indicate corresponding parts.

This improvement relates to breech-loading fire-arms in which a swinging breech-piece is employed. In such fire-arms it is desirable, for obvious reasons, that the axis of the hinge-joint upon which the breech swings should be as near as practicable to the line of bore of the barrel; and in order to accomplish this result without sacrificing the strength of the hinge and without the cutting away or otherwise reducing the thickness of the exterior of the rear portion of the chamber of the barrel in such manner as to impair its strength, the improvement consists in providing in what may be termed the "hub" of the breech-piece—that is to say, that part of the hinge-joint which constitutes a portion of the breech-piece—a recess the profile of which, taken in a plane passing longitudinally through the axis of the hinge, is in the form of an arc concentric with the axis of the bore of the barrel.

To enable others skilled in the art to understand and apply the improvement, we will proceed to describe it with the aid of the drawings.

A represents the barrel of the fire-arm, secured in the breech-receiver B, into which the swinging breech-piece C is pivoted or hinged by means of a transverse pin, D, inserted through the said breech-piece and through the sides of the breech-receiver.

*a* is the recess in the hub or hinge portion of a breech-piece, which constitutes the improvement. The form of this recess is best shown in Fig. 2, which represents its section in a plane passing through the axis of the hinge, and shows its profile in that plane to be in the form of an arc concentric with the axis of the bore of the barrel. This recess, when the breech-piece is open, as shown in Fig. 1, forms a channel or passage for the free entry of the cartridges into the chamber of the fire-arm. The effect of this recess *a* may be clearly seen by reference to the two parallel red lines in Fig. 2. The upper one of these red lines shows that if the hub of the breech-piece were made without the recess, and of the same thickness all across as it is at the sides of the recess, it would be necessary to cut away the lower part of the exterior of the rear end of the barrel or chamber to such extent as to make it very thin and weak in order to permit the hinge to work, and even in that case the cartridge could not enter freely thereinto. The lower red line shows that if the hub of the breech-piece were made without the recess, and of the same thickness all across as it is of the bottom of the recess, the hub or hinged portion of the breech-piece would be very weak. The only method of obtaining the necessary strength of the hinge and of the portion of the chamber that could be adopted if the recess *a* were not provided would be to place the pin D lower down or farther from the line of bore, which would be very objectionable, as it would then offer less resistance to the tendency of the breech to open in firing. The recess, it will be seen, enables a considerable thickness of metal to be retained in those portions, *c c*, of the hub or hinge on opposite sides of it, and obtains sufficient strength of hinge without cutting away the barrel, while the pin D or center of the hinge is kept very near the line of bore of the barrel.

This improvement is not limited in its application to swinging-breech fire-arms in which the hinge is below the barrel, but is applicable when the hinge is in any other position.

What we claim, and desire to secure by Letters Patent, is—

The recess *a*, provided in the hub or hinged portion of the breech-piece in such relation to the barrel or chamber as is herein described, for the purpose set forth.

C. L. PERKINS,
*President of the Berdan Fire Arms Manufacturing Co.*

ISAAC FRYER,
*Secretary of the Berdan Fire Arms Manufacturing Co.*

Witnesses:
S. D. SCHUYLER,
JAMES SIMSON.